United States Patent [19]
Schulz

[11] Patent Number: 5,359,412
[45] Date of Patent: Oct. 25, 1994

[54] OPTICAL FREQUENCY DISCRIMINATOR USING TWO MACH-ZEHNDER INTERFEROMETER ARRANGEMENT

[75] Inventor: Peter A. Schulz, Andover, Mass.

[73] Assignee: Massachusetts Institute of Technology, Cambridge, Mass.

[21] Appl. No.: 963,807

[22] Filed: Oct. 20, 1992

[51] Int. Cl.$^5$ .............................. G01B 9/02
[52] U.S. Cl. .................. 356/345; 359/182; 250/227.19
[58] Field of Search .............. 356/345; 250/227.19, 250/227.27; 359/182, 187

[56] References Cited

U.S. PATENT DOCUMENTS 3,584,956  3/1971  Hines .
3,795,447  3/1974  Welch et al. .
4,805,235  2/1989  Henmi .

FOREIGN PATENT DOCUMENTS 3-211927  9/1991  Japan .
8923879.4  1/1991  United Kingdom .
9100769.0  1/1991  United Kingdom .

OTHER PUBLICATIONS

J. Stone and L. W. Stulz, "Pigtailed High-Finesse Tunable Fibre Fabry-Perot Interferometers with Large, Medium and Small Free Spectral Ranges", Electronics Letters, Jul. 16, 1987, vol. 23, No. 15.
K. T. Koai and R. Olshansky, "Simultaneous Optical Amplification, Detection, and Transmission Using In-Line Semiconductor Laser Amplifiers", May 1992, Photonics Technology Letters, vol. 4, No. 5, May 1992, pp. 441–443.
M. J. Chawki, L. Le Guiner, D. Dumay and J. C. Keromnes, "Transmission System Using FP Laser as FSK Discriminator/Photodetector", Electronics Letters, 28, 1573, Aug. 13, 1992 Semiconductor Optical Amplifier, BTD Publication No. 008.
Revision 1, Issue Date Jan. 17, 1992, pp. 1–6, G. E. Betts, K. G. Ray and C. H. Cox III, "Optical Analog Link Using an External Modulator", pp. 7, 8 and 9.

Primary Examiner—Samuel A. Turner
Assistant Examiner—Robert Kim
Attorney, Agent, or Firm—Wolf, Greenfield & Sacks

[57] ABSTRACT

An optical frequency discriminator having enhanced linearity is provided, which discriminator may be utilized in FM communications systems or in other applications. The discriminator has two interferometers with the optical path length difference for the first interferometer being $\Delta L$ and for the second interferometer being $m\Delta L$ where $m > 1$. The optical FM signal is applied in parallel to both optical interferometers with approximately $m^3$ times as much of the signal being applied to the first interferometer as to the second interferometer. Each interferometer has an output signal versus frequency characteristic with a substantially linear region about a center frequency, which center frequency is approximately equal to the center frequency of the input optical signal. The outputs from the interferometers are combined in a manner such as the difference in absolute value of the linear region characteristic slopes is obtained, the resulting output being a discriminated output which is substantially linear over an enhanced FM range.

14 Claims, 3 Drawing Sheets

OPTICAL FREQUENCY DISCRIMINATOR USING TWO MACH-ZEHNDER INTERFEROMETER ARRANGEMENT

This invention was made with government support under contract Number F19628-90-C-0002 awarded by the Air Force. The government has certain rights in the invention.

FIELD OF THE INVENTION

This invention relates to optical frequency discriminators and more particularly to optical frequency discriminators having improved linearity which are particularly adapted for use in optical FM communications systems.

BACKGROUND OF THE INVENTION

Because of the large inherent bandwidth of optical systems, such systems are being increasingly utilized for transmitting information, generally over fiber optic cables, in telephony, cable television, data processing and other applications. Heretofore, such systems have typically used amplitude modulation because it is simple to implement. However, frequency modulation can provide an order of magnitude or more increase in signal-to-noise ratio. This is because the predominant noise sources are sources of amplitude noise rather than frequency noise. While this signal-to-noise ratio advantage has been taken advantage of for many years in the radio field, FM is not currently being employed to any extent in optical communications for a number of reasons.

One reason why optical FM communications are not more extensively utilized is that current applications are typically binary. For such applications, the signal-to-noise ratio improvement provided by FM is in most applications not sufficiently important to warrant the increased cost and complexity of an FM system. For analog communication or communication involving a multiplicity of discrete optical frequency levels, where noise may present problems, current optical frequency discriminators have been found to provide linearity over such a short frequency range that it is difficult to obtain distortion free outputs over a useful range of modulating frequencies.

The lack of an optical frequency discriminator which provides a substantially linear output over an extended frequency range is also a problem in other applications, for example, in many applications where accurate, high speed testing or measurement of the optical frequency of a changing signal is required. Frequency shift key (FSK) systems are one such application.

A need therefore exists for an improved frequency discriminator for use in optical FM communication systems and other applications, which discriminator provides a substantially linear output over an enlarged frequency range. It is an object of this invention to provide such a discriminator. A further object is to provide an enhanced optical FM communications system capable of providing distortion-free operation over an extended frequency range.

SUMMARY OF THE INVENTION

In accordance with the above, this invention provides an optical frequency discriminator and an optical FM communication system using such discriminator. The communications system includes an FM optical signal generator having a center frequency f' and an instantaneous frequency f, a fiber optic line or other suitable means for transmitting the FM optical signal and a receiver and detector for the FM signal. The receiver and detector include an optical frequency discriminator having a first optical interferometer and a second optical interferometer. Each interferometer has two optical paths, the difference in optical path length for the first optical interferometer being $\Delta L$ and the difference in optical path length for the second optical interferometer being $m\Delta L$ where $m > 1$. The optical FM signal is applied in parallel to the first and second optical interferometers with approximately $m^3$ times as much of the signal being applied to the first interferometer as to the second interferometer. Each of the interferometers has an output signal versus frequency characteristic with a substantially linear region about a center frequency, which center frequency is approximately equal to f'. The outputs from the interferometers are combined in a manner such that the difference in absolute value of the linear region characteristic slopes is obtained, thereby generating the discriminated output.

The value of $\Delta L$ and m are selected such that $f'\Delta L/c = P \pm \frac{1}{4}$ and $f'm\Delta L/c = Q \pm \frac{1}{4}$, where P and Q are integers and c is the speed of light. For preferred embodiments m is in a range of approximately 1.5 to 2.5, being approximately 2 for a preferred embodiment. With m being approximately 2, approximately 8 times as much of the signal is applied to the first interferometer as to the second interferometer.

A means is preferably provided for controlling the lengths $\Delta L$ and $m\Delta L$ to maintain a substantially constant center frequency f'. Where the paths are formed by optical fibers, as they are for preferred embodiments, $\Delta L$ and $m\Delta L$ may be controlled by controlling the temperature and/or the stress in the optical fiber for at least one path in each of the interferometers. The control of temperature and/or stress for each optical interferometer is preferably achieved by feeding back at least a low frequency component of the output from such interferometer. The length difference $\Delta L$ is selected to achieve a desired FM frequency range about a given center frequency.

The foregoing and other objects, features and advantages of the invention will be apparent from the following more particular description of a preferred embodiment of the invention as illustrated in the accompanying drawings.

In the drawings

DETAILED DESCRIPTION

Figure 1:
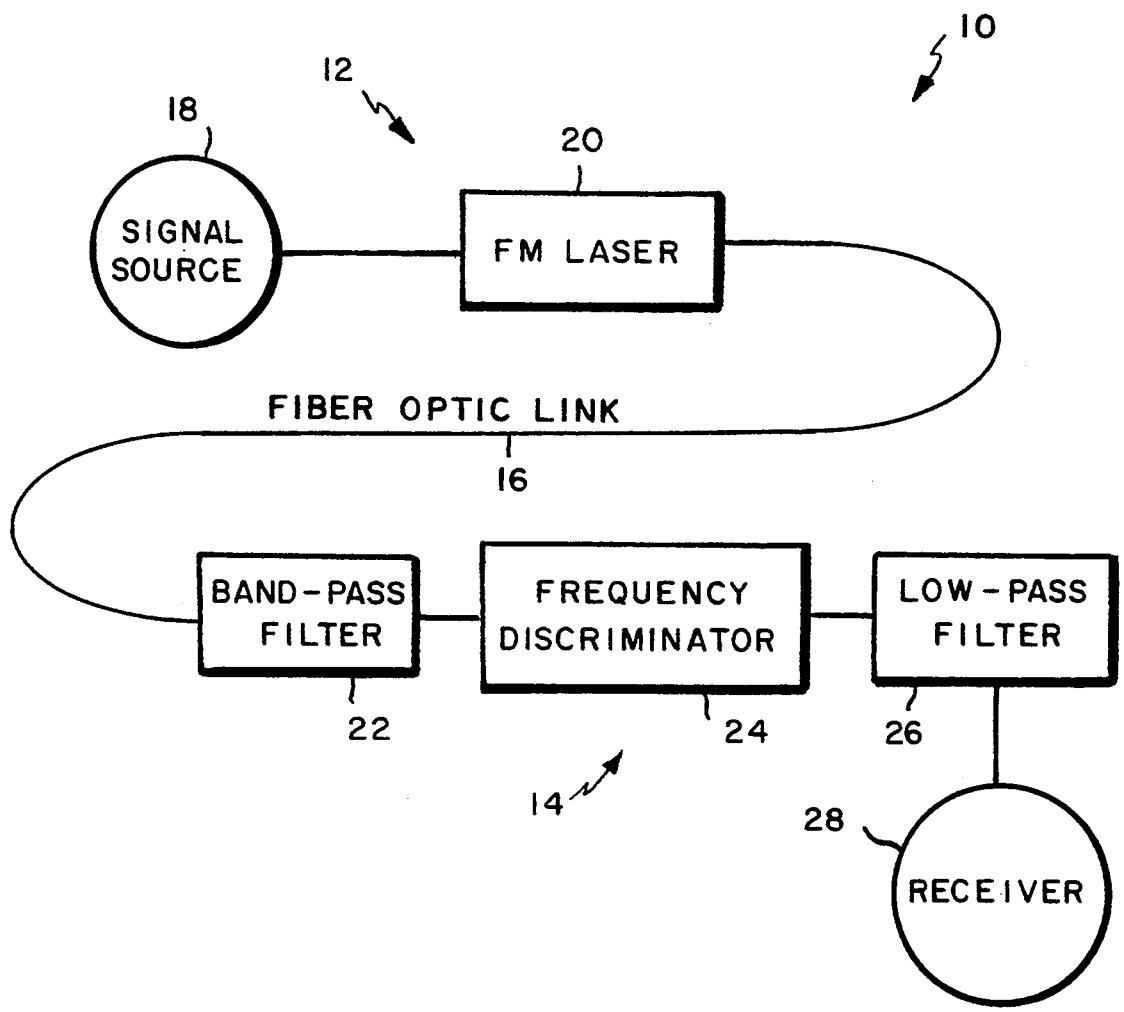
FIG. 1 is a schematic block diagram of an optical FM communications system suitable for use in practicing the teachings of this invention.

FIG. 1 illustrates an optical communications system 10 having an FM optical source 12, an optical detector and receiver 14, and an optical link 16 between the transmitter and receiver. Optical link 16 is preferably a fiber optic line or fiber optic cable; however, this is not a limitation on the invention. For example, where there is a straight-line, unobstructed optical path between the transmitter and receiver, as for example for communications with earth satellites, a coherent FM laser beam may be transmitted directly through space (i.e. air or vacuum) without a fiber optic cable.

Optical FM transmitter 12 consists of a signal source 18 which is applied to modulate an FM laser 20. Signal source 18 can be a binary digital source; however, the linearity enhancements of this invention are most advantageous when employed in either an analog system or a system having a substantial number of discrete levels.

FM laser 20 may be any of a number of devices which generate a laser output at a frequency which varies as a function of an applied input signal. Frequency modulated FM diode lasers are available. A frequency modulated Nd:YAG laser suitable for use as the FM laser 20 is described in a paper entitled "Frequency-modulated Nd:YAG Laser" by P. A. Schulz and S. R. Henion", Optics Letters, Apr. 15, 1991, Vol. 16, No. 8, pp. 578–580.

Receiver/detector 14 includes a bandpass filter 22, a frequency discriminator 24, low pass filter 26, and receiver 28. Bandpass filter 22 removes frequency channels of the received signal that are outside of the desired frequency range. Frequency discriminator 24 converts the received optical signals into voltage outputs, the amplitudes of which vary as a function of the received frequency. In order to avoid distortion in the output signal, it is important, particularly for analog signals, that the variations in output voltage amplitude exactly track the frequency variations at the discriminator input. In other words, it is important that the discriminator output be substantially linear over the modulation frequency range. Low pass filter 26 eliminates any high frequency components from the discriminator output that fall outside the modulation bandwidth and applies the resulting voltage signal to receiver 28 where it may be utilized to produce an audio or video output or for other purposes known in the art.

Figure 3A:
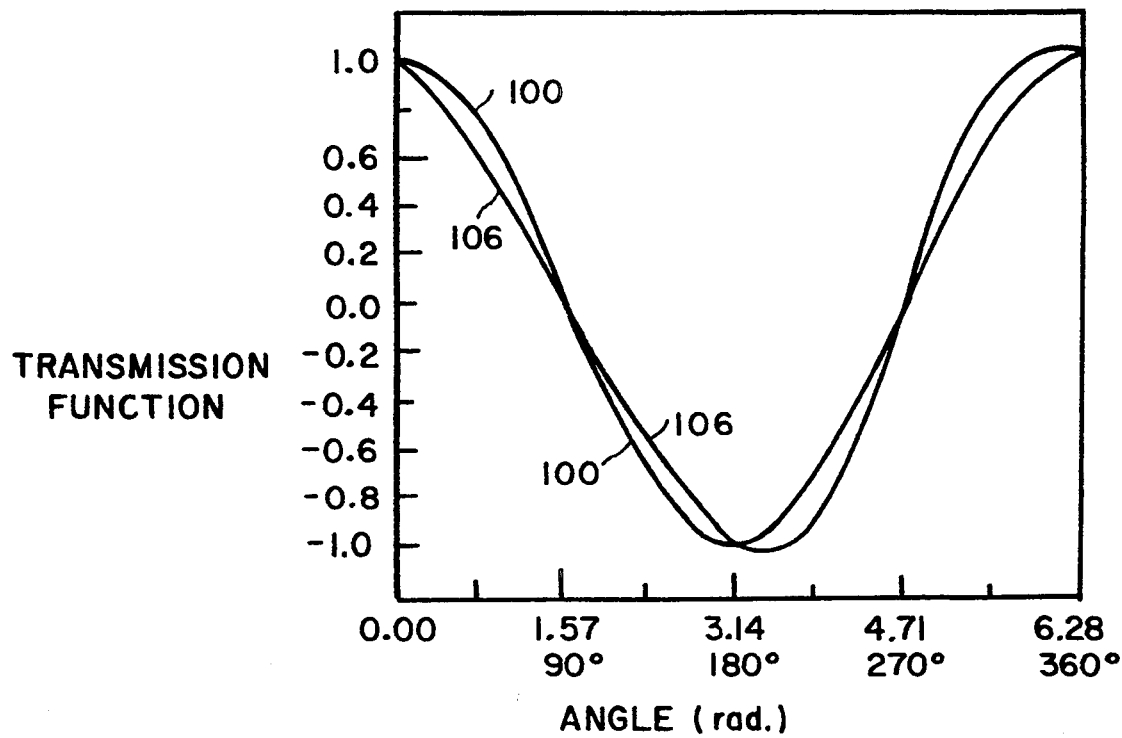
FIGS. 3A and 3B are graphs illustrating the improvement in discrimination linearity achievable utilizing the optical frequency discriminator of FIG. 2 in lieu of a comparable discriminator having only a single interferometer.

As previously indicated, a major problem with FM communication systems of the type shown in FIG. 1, particularly when used for analog applications, is that frequency discriminator 24 has not been sufficiently linear to provide a distortion free output. In particular, where the discriminator utilized employs a single optical interferometer, the transmit function is basically a cosine function, which, as can be seen from FIG. 3A, is linear for only relatively small regions on either side of $n\pi/2$ (where n is an odd integer). The deviation from linearity for such a discriminator in its most linear region, which generally extends for approximately 45° on either side of a 90° (or other $n\pi/2$) point), is illustrated by line 102 in FIG. 3B. As indicated above, a primary object of this invention is to provide an optical frequency discriminator which enhances linearity in this region by approximately a factor of 30.

Figure 2:
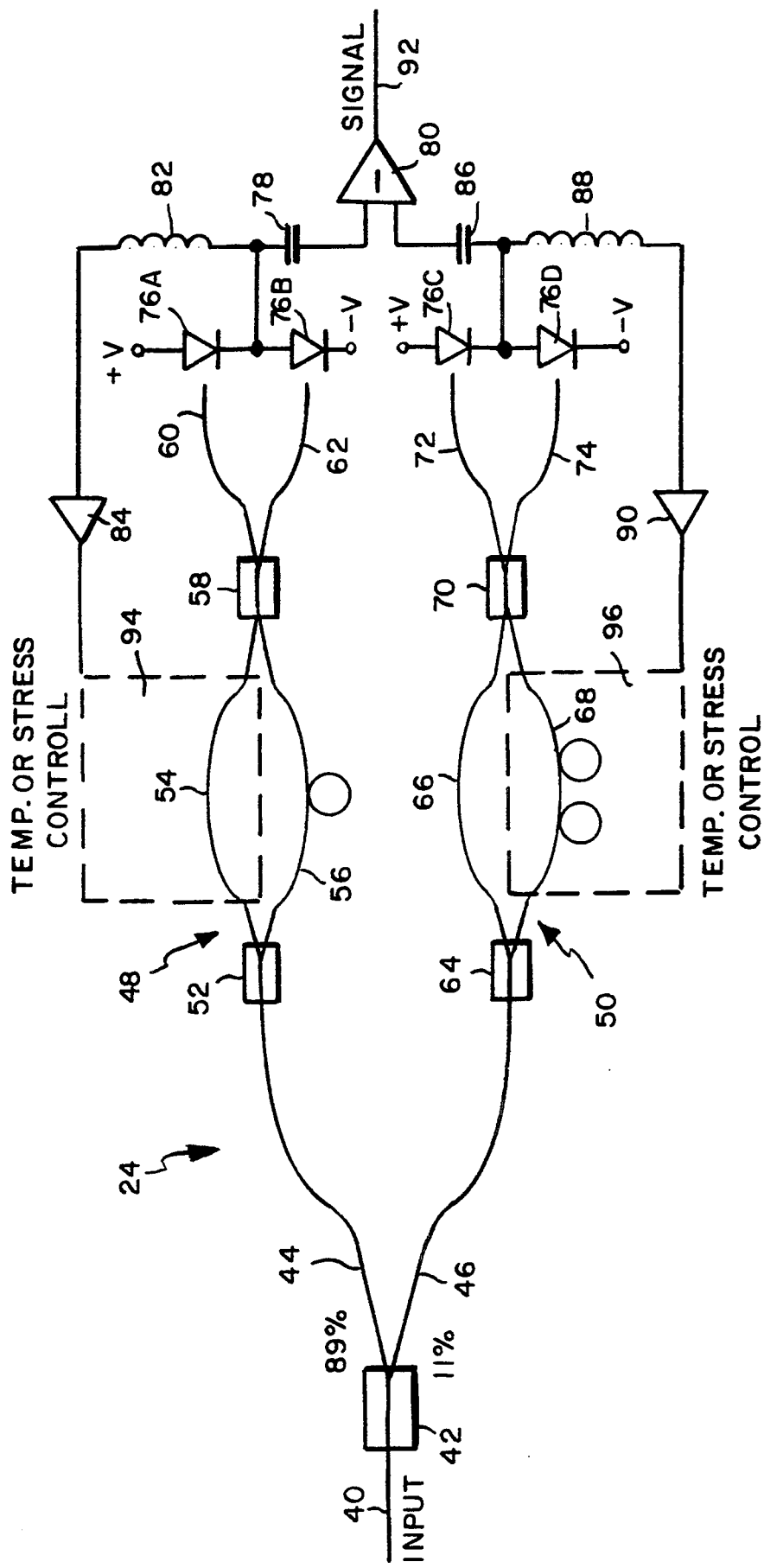
FIG. 2 is a schematic representation of an optical frequency discriminator suitable for use as the frequency discriminator in the communications system of FIG. 1.

A preferred embodiment for a frequency discriminator in accordance with the teachings of this invention is illustrated in FIG. 2. Referring to FIG. 2, the input to discriminator 24 on line 40 is applied to a coupler 42 having outputs 44 and 46. For the preferred embodiments, lines 40, 44 and 46 are all fiber optic lines or cables, as are the remaining optical lines of the discriminator, including all of the optical paths of the interferometers. Coupler 42 is designed to apply substantially more of the input on line 40 to line 44 than to line 46. As will be discussed in greater detail later, the exact ratio of the signals on lines 44 and 46 depends on the relative length differences of the two interferometers.

Line 44 is connected as the input to a first interferometer 48 and optical line 46 is connected as the input to a second optical interferometer 50. More particularly, line 44 is connected as the input to an optical coupler 52 which divides the input applied thereto equally between optical lines 54 and 56. Optical line 54 has a length L and optical line 56 has a length $L + \Delta L$. Lines 54 and 56 are connected as inputs to optical coupler 58. Since the phase relationship of the optical inputs to coupler 58 are a function of the differences in length of the optical paths 54 and 56 (a constant), and vary as a sine wave function of the instantaneous input frequency, the inputs applied to coupler 58 divide between the coupler optical output lines 60 and 62 in amounts which also vary as a sine wave function of instantaneous input frequency. Thus, the output power of the transmitted signals on lines 60 and 62 are complementary wave functions, one being maximum when the other is minimum.

Similarly, the optical signal on line 46 is applied to an optical coupler 64 which divides the input applied thereto equally between optical paths 66 and 68. Optical path 66 has a length $L'$, which may or may not be the same as L, and optical path 68 has a length $L' + m\Delta L$. For preferred embodiments, m is in a range between approximately 1.5 and 2.5. For the embodiment shown in FIG. 2, m is equal to 2. It has also been found that best results are obtained with the division ratio in coupler 42 being $m^3$ to 1. Therefore, the ratio of signals on lines 44 and 46 is approximately 8 to 1 for the embodiment shown (89% of the signal on line 44 and 11% of the signal on line 46) where m=2.

The optical signals on lines 66 and 68 are applied to coupler 70 where, like for coupler 58, as a result of the differences in lengths of paths 66 and 68, the coupler outputs on optical lines 72 and 74 are in a ratio which varies as a sine wave function of the instantaneous input frequency.

The optical signal appearing on each of the lines 60, 62, 72 and 74 is applied to an optical detector which, for the preferred embodiment, are shown as photodiodes 76A–76D, respectively. The anodes of diodes 76A and 76C are connected to a positive voltage terminal and the cathodes of diodes 76B and 76D are connected to a negative voltage terminal. Diodes 76A and 76B are connected in series with the junction of these diodes being connected through a capacitor 78 as one input to signal combining circuit 80 and through a coil 82 to amplifier 84, the components 78 and 82 functioning as a bias tee. Thus, low frequency components of the output from interferometer 48 are applied to amplifier 84 and higher frequency components of the output to circuit 80.

Similarly, diodes 76C and 76D are connected in series with the junction of these diodes being connected through a capacitor 86 as the other input to combining circuit 80 and through a coil 88 as the input to amplifier 90. With the diodes connected as shown in FIG. 2, combining circuit 80 is a subtraction circuit subtracting the high frequency component signal received from first interferometer 48 through capacitor 78 from the high frequency signal component received from second interferometer 50 through capacitor 86. The output from subtraction circuit 80 on line 92 is the desired discriminated output with enhanced linearity.

The low frequency outputs from amplifiers 84 and 90 are applied as feedback inputs to control devices 94 and 96, respectively. As will be discussed in greater detail later, the objective of control devices 94 and 96 are to control the path length differences in interferometers 48 and 50 so that the center frequency for the linear region of each interferometer output is at a frequency which is substantially the same as the center frequency of the FM signal on link 16 from source 12. Controls 94 and 96 are fine tuning controls to compensate for drifts in the center frequency which may arise as a result of changes in temperature or other environmental conditions or from component changes. As will be discussed in more detail later, very small changes in $\Delta L$ or m$\Delta L$ can prevent the detection function from being properly performed. Control device 94 may control the temperature of one path of interferometer 48, for example path 54 as shown, to control the length $\Delta L$, or control device 94 may effect this control by controlling the stress in the fiber forming path 54. Other techniques for fine tuning the effective length of an optical fiber may also be utilized. Control device 96 may similarly control the temperature, stress, or other appropriate parameter of an optical fiber for one of the paths of interferometer 50, for example path 68 as shown in FIG. 2.

Figure 3B:
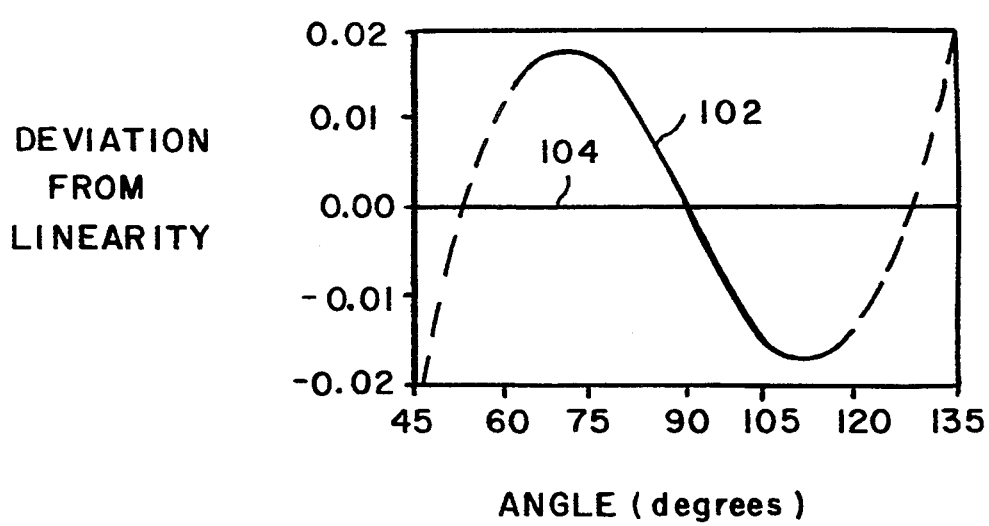

Referring again to FIG. 3A, these curves plot the output transmission function for the discriminator versus a value which varies with the instantaneous received frequency. In particular, FIG. 3A is a plot of transmission function T versus a value X which varies with instantaneous frequency where $T=(1+\cos X)/2$ and $X=4\pi f\Delta L/c$, c being the speed of light. From line or curve 100 in FIG. 3A, it is seen that, with a single interferometer, T is relatively linear in the area close to $X=\pi/2$(i.e. 90° ). Curve 102 in FIG. 3B shows the deviations from linearity with a single interferometer for 45° on either side of the 90° point. It should be noted that curve 100 is also substantially linear at succeeding points which satisfy the relationship $X=\pi/2+n\pi$ where n is an integer.

In order to obtain enhanced linearity in the region shown in FIG. 3B so as to have, for example, a deviation from linearity curve such as that shown for line 104 rather than line 102, the two interferometers should have lengths such that $f'\Delta L/c=\pm\frac{1}{4}$ and $f'm\Delta L/c=Q\pm\frac{1}{4}$ where P and Q are integers. m is preferably in the range between 1.5 and 2.5, m=2 for a preferred embodiment. The reason why very tight control of the $\Delta L$ and m$\Delta L$ lengths are required becomes apparent for the relationships above when it is realized that the numbers P and Q would typically be in the range of 10,000 to 20,000. Therefore, a very small percentage change in $\Delta L$ or m$\Delta L$ can significantly degrade the desired relationship indicated above.

While the values of L and L' are not critical, it is generally desirable to keep these values relatively short to reduce fiber costs and optical delays. $\Delta L$ is determined to some extent by the desired frequency range. Generally, enhanced linearity is obtained with a smaller frequency range; however, with this invention deviations from linearity can be minimized over a relatively large frequency range. The relationship between $\Delta L$ and the maximum frequency demodulation range $\Delta f$ is that $\Delta L=c/3\Delta f$. Therefore, if for example a frequency range of 10 GHz is desired, $\Delta L$ should be approximately 1 cm; while a frequency range of 100 MHz would require a $\Delta L$ of approximately 1 m.

Curve 106 in FIG. 3A is an example of the enhanced linearity transmission characteristic obtainable utilizing the two interferometer discriminator of FIG. 2. Curve 104 in FIG. 3B illustrates the factor of 30 improvement in linearity over the range of approximately 45° on either side of the center frequency. This improvement is from an approximately 2% deviation from straight line for curve 102 to only an 0.06% deviation for curve 104.

While the invention has been shown and described above with reference to a preferred embodiment, it is apparent that various changes in form and detail might be made therein. For example, while combining circuit 80 has been shown as a subtraction circuit in FIG. 2, with the polarities reversed on the photodiodes for one of the interferometers, the combining circuit could be an adder rather than a subtracter. Stated another way, if the slope for the transmission function characteristic curves (FIG. 3A) for both interferometers 48 and 50 are in the same direction, then the outputs are subtracted as shown in FIG. 2, while if these slopes are in opposite directions (i.e. for example one slope is at the 90° point and the other at the 270° point) then the outputs for the two interferometers would be added. The following table indicates the sign of combining circuit 80 (i.e. + for adder or — for subtractor) in terms of the previously stated equations for interferometer length difference:

| f'$\Delta L$/c | mf'$\Delta L$/c | Sign for Combining Circuit 80 |
| --- | --- | --- |
| P + $\frac{1}{4}$ | Q + $\frac{1}{4}$ | — |
| P + $\frac{1}{4}$ | Q − $\frac{1}{4}$ | + |
| P − $\frac{1}{4}$ | Q + $\frac{1}{4}$ | + |
| P − $\frac{1}{4}$ | Q − $\frac{1}{4}$ | — |

From the above table, it is seen that circuit 80 combines the interferometer outputs such that the difference in absolute value of the characteristic slopes is obtained.

Controls 94 and 96 might be applied to either path for the given interferometer rather than just to the path shown, or could be applied to both paths, for example in different directions. However, there is not sufficient advantage to controlling both paths to justify the added cost and complexity. Further, the circuit of FIG. 2 is particularly adapted to eliminate third order nonlinearities in the signal, these being the major source of nonlinearity. However, it may be possible, if desired, to eliminate higher order nonlinearities by providing additional interferometers in parallel. In addition, while FIG. 1 illustrates an FM optical communications application for the discriminator of FIG. 2, the discriminator may also be utilized in other applications such as in testing and measuring of optical signals experiencing frequency changes, either through modulation or otherwise.

Thus, foregoing and other changes in form and detail may be made in the invention by one skilled in the art without departing from the spirit and scope of the invention.

What is claimed is:

1. An optical frequency discriminator for an optical FM signal having a center frequency f' and an instantaneous frequency f, the discriminator comprising:
   a first optical interferometer having two paths with an optical path length difference $\Delta L$;
   a second optical interferometer having two paths with an optical path length difference of m$\Delta L$, where m>1;
   means for simultaneously applying said optical FM signal in parallel to said first and second optical interferometers, approximately $m^3$ times as much of said signal being applied to the first interferometer as to the second interferometer;

each of said interferometers having an output signal versus frequency characteristic with a substantially linear region about a center frequency, which frequency is approximately equal to f', each of said linear regions having a slope, which slopes may be different for each interferometer; and means for combining the interferometer outputs such that the difference in absolute values of the slopes is obtained.

2. A discriminator as claimed in claim 1 wherein the values of $\Delta L$ and m are selected such that $f'\Delta L/c = P\pm\frac{1}{4}$ and $f'm\Delta L/c = Q+\frac{1}{4}$ where P and Q are integers and c is the speed of light.

3. A discriminator as claimed in claim 1 wherein the path length difference for the second optical interferometer is in the range of approximately 1.5 $\Delta L$ to 2.5 $\Delta L$.

4. A discriminator as claimed in claim 1 wherein the path length difference for the second optical interferometer is approximately equal to 2 $\Delta L$, approximately eight times as much of said signal being applied to the first interferometer as to the second interferometer.

5. A discriminator as claimed in claim 1 including means for controlling $\Delta L$ and m$\Delta L$ to maintain a substantially constant center frequency for each interferometer at a value approximately equal to f'.

6. A discriminator as claimed in claim 5 wherein said optical paths are formed by optical fibers; and wherein said means for controlling includes means for controlling the temperature of the optical fiber for at least one path in each of said interferometers.

7. A discriminator as claimed in claim 5 wherein said optical paths are formed by optical fibers; and wherein said means for controlling includes means for controlling the stress in the optical fiber for at least one path in each of said interferometers.

8. A discriminator as claimed in claim 5 wherein said optical paths are formed by optical fibers; and wherein said means for controlling includes means for feeding back at least a low frequency component of the output from each optical interferometer to control at least one of the temperature of and stress in the fiber forming at least one path of the corresponding interferometer.

9. A discriminator as claimed in claim 1 wherein $\Delta L$ is selected to achieve a desired FM frequency range about a given f'.

10. An FM optical communication system comprising:

means for generating an FM optical signal having a center frequency of f' and an instantaneous frequency f;

means for transmitting the FM optical signal; and means for receiving and detecting the transmitted FM optical signal, said receiving and detecting means including an optical frequency discriminator having a first optical interferometer with two paths having a path length difference $\Delta L$, a second optical interferometer with two paths having a path length difference of m$\Delta L$, where m>1, means for simultaneously applying said optical FM signal in parallel to said first and second optical interferometers, approximately $m^3$ times as much of said signal being applied to the first interferometer as to the second interferometer, each of said interferometers having an output signal versus frequency characteristic with a substantially linear region about a center frequency, which frequency is approximately equal to f', each of said linear regions having a slope, which slopes may be different for each interferometer, and means for combining the interferometer outputs such that the difference in absolute values of the slopes is obtained.

11. A system as claimed in claim 10 wherein the values of $\Delta L$ and m are selected such that $f'\Delta L/c \pm P\pm\frac{1}{4}$ and $f'm\Delta L/c = Q\pm\frac{1}{4}$ where P and Q are integers and c is the speed of light.

12. A system as claimed in claim 5 including means for controlling $\Delta L$ and m$\Delta L$ to maintain a substantially constant center frequency for each interferometer at a value approximately equal to f'.

13. A system as claimed in claim 10 wherein said means for transmitting and the optical paths of said discriminator are formed by optical fibers.

14. A system as claimed in claim 13 wherein said means for controlling includes means for feeding back at least a low frequency component of the output from each optical interferometer to control at least one of the temperature of and stress in the fiber forming at least one path of the corresponding interferometer.

* * * * *